(12) United States Patent
Tracy et al.

(10) Patent No.: US 6,762,214 B1
(45) Date of Patent: Jul. 13, 2004

(54) PROCESS FOR THE PRODUCTION OF RIGID FOAMS FROM ALKALINE POLYETHER POLYOLS

(75) Inventors: Jerry E. Tracy, Middlebourne, WV (US); Scott A. Kane, New Martinsville, WV (US); Robert P. Yeater, Moundsville, WV (US); Karl W. Haider, Hurricane, WV (US)

(73) Assignee: Bayer Polymers LLC, Pittsburgh, PA (US)

( * ) Notice: Subject to any disclaimer, the term of this patent is extended or adjusted under 35 U.S.C. 154(b) by 0 days.

(21) Appl. No.: 10/391,312

(22) Filed: Mar. 18, 2003

(51) Int. Cl.$^7$ ................................................. C08G 18/28
(52) U.S. Cl. ........................ 521/174; 521/123; 521/131; 521/167
(58) Field of Search ................................. 521/131, 167, 521/174, 123

(56) References Cited

U.S. PATENT DOCUMENTS

| | | | |
|---|---|---|---|
| 4,430,490 A | 2/1984 | Doerge | 528/77 |
| 5,786,405 A | 7/1998 | Schilling et al. | 521/167 |
| 6,004,482 A | * 12/1999 | Adkins et al. | 252/400.62 |
| 6,339,110 B1 | 1/2002 | Cappella et al. | 521/131 |

* cited by examiner

Primary Examiner—John M. Cooney, Jr.
(74) Attorney, Agent, or Firm—Joseph C. Gil; N. Denise Brown

(57) ABSTRACT

The present invention relates to a process for the preparation of rigid foams comprising reacting a polyisocyanate component with an isocyanate-reactive component in the present of a blowing agent. Suitable isocyanate-reactive components for the presently claimed invention comprises polyether polyols having an OH number of from 200 to 800 and containing from 3 to 8 hydroxyl groups wherein the level of alkalinity present in the polyether polyol is equivalent to a hydroxide ion level of from about 0.006% to about 0.21% by weight.

21 Claims, No Drawings

PROCESS FOR THE PRODUCTION OF RIGID FOAMS FROM ALKALINE POLYETHER POLYOLS

FIELD OF THE INVENTION

The present invention relates to a process for the production of molded rigid foams comprising reacting a polyisocyanate component with an isocyanate-reactive component in the presence of at least one blowing agent, wherein the isocyanate-reactive component comprises a polyether polyol containing alkalinity. The level of alkalinity present in the polyether polyols is equivalent to a hydroxide ion level of from about 0.006% to about 0.21% by weight.

BACKGROUND OF THE INVENTION

Polyether polyols are known to be useful in the production of rigid polyurethane and polyurethane-polyisocyanurate foams. In one of the most common methods for the production of these polyols, a polyhydric alcohol such as sucrose is reacted with an alkylene oxide such as ethylene oxide or propylene oxide in the presence of an alkaline catalyst such as sodium hydroxide. As polyether polyol synthesis is generally practiced, prior to use in the production of foams, any alkaline catalyst present in the polyether polyol is neutralized and/or removed. This is generally accomplished by addition of an acid to neutralize the alkaline catalyst. This neutralization frequently results in the precipitation of a solid salt in the polyether polyol which salt may be removed by filtration. The removed solid is commonly called the filter cake. Traditionally, sulfuric acid has been used to neutralize polyether polyols.

U.S. Pat. No. 4,430,490 discloses a process for producing a polyether polyol from a polyhydric alcohol in which the alkaline catalyst is neutralized with a hydroxy-carboxylic acid, which is soluble in the polyol. The use of this hydroxy-carboxylic acid to neutralize the alkaline catalyst makes it possible to obtain a clear polyol product, which does need to be filtered before use and does not contribute to the generation of a filter cake requiring disposal.

U.S. Pat. No. 5,786,405 discloses a process for the production of a clear amine initiated polyether polyol by epoxidizing an amine in the presence of potassium hydroxide and upon completion of epoxidation, adding lactic acid to the epoxidized mixture in an amount sufficient to neutralize any remaining alkali metal hydroxide. It is beneficial to neutralize polyether polyols with lactic acid because during neutralization, lactic acid produces a lactate salt, such as potassium lactate, which is soluble in the polyether polyol, and therefore, does not require an additional process step to remove. However, the major problems observed with lactic acid neutralized polyether polyols are the increased reactivity and high pressure during the polyurethane foam forming reaction. High reactivity results in insufficient flow and therefore incomplete filling of the cavities of the mold, while increased pressure can lead to deformation of the finished foam.

Amine-initiated polyether polyols and a process for their production are also described in copending U.S. application Ser. No. 10/372,361, filed Feb. 21, 2003. These amine-initiated polyether polyols are short chain polyether polyols, which are prepared by epoxidizing an amine in the presence of an alkaline catalyst, wherein the quantity of alkaline catalyst is reduced and added earlier in the epoxidation process than normal. Once epoxidation is complete, a hydroxy carboxylic acid is added to neutralize any alkaline catalyst remaining. The resultant short chain polyether polyols exhibit foam processing characteristics similar to those of conventional sulfuric acid neutralized polyether polyols.

Surprisingly, it has now been found that non-neutralized polyether polyols, particularly amine-initiated polyether polyols that are not neutralized, can be used to prepare polyurethane foams. The processing of foams prepared with these alkaline polyether polyols proceeds without high pressures and with rapid foam rise rates. Low pressures during foaming are preferred since many rigid foaming processes require filling and/or foaming of the polyurethane-forming reaction mixture behind a thin shell which is not necessarily clamped in a mold during the foaming process. High pressures are preferably avoided as these result in surface imperfections in the foamed part, and in extreme cases, in fracturing of the outer shell. Thus, the present invention provides advantages over the amine-initiated polyether polyols as described in U.S. Pat. Nos. 5,786,405 and 6,339,110. Faster rise rates are advantageous because they allow for reduced cycle times.

SUMMARY OF THE INVENTION

This invention relates to a process for the preparation of a rigid polyurethane foam. This process comprises (1) reacting (A) a polyisocyanate component having an NCO group content of from 20 to 60%, with (B) an isocyanate-reactive component which comprises an alkaline polyether polyol having an OH number of from 200 to 800 and containing from 3 to 8 hydroxyl groups, wherein the level of alkalinity of the polyether polyols is equivalent to a hydroxide ion level of from about 0.006% to about 0.21% by weight; in the presence of (C) at least one blowing agent. In accordance with the present invention, it is preferred that the polyisocyanate components comprise (1) from 50 to 100% by weight of polymethylene poly(phenylisocyanate) having an NCO group content of from 24 to 34%, which comprises from 30 to 80% by weight of monomeric isocyanate and from 20 to 70% by weight of higher ring compounds of the diphenylmethane diisocyanate series, wherein the monomeric isocyanate comprises from 65 to 98% by weight of the 4,4'-isomer of diphenyl-methane diisocyanate, from 2 to 35% by weight of the 2,4'-isomer of diphenylmethane diisocyanate and from 0 to 5% by weight of the 2,2'-isomer of diphenylmethane diisocyanate; and (2) from 0 to 50% by weight of toluene diisocyanate having an NCO group content of 48%.

In accordance with the present invention, it is preferred that (B) the isocyanate-reactive component comprises an amine-initiated polyether polyol, and most preferably an o-toluenediamine initiated polyether polyol. These preferably have an OH number of from 300 to 500 and preferably contain from 3.5 to 4.2 hydroxyl groups. The level of alkalinity of these amine-initiated polyether polyols is preferably equivalent to a hydroxide ion level ranging from about 0.014% to about 0.11% by weight.

DETAILED DESCRIPTION OF THE INVENTION

Suitable polyisocyanate components for the present invention include those having an NCO group content of from 20 to 60%, preferably from 20 to 40% by weight, more preferably from 24 to 34% by weight and most preferably from 28 to 33% by weight. The suitable polyisocyanates which may be used in accordance with the present invention include monomeric diisocyanates, NCO prepolymers, and preferably liquid polyisocyanates and polyisocyanate adducts. Suitable monomeric diisocyanates may be represented by the formula $R(NCO)_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylenediisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocya-natocyclohexyl) methane, 2,4'-dicyclohexylmethane diisocyanate, 1,3- and 1,4-bis(isocyanatomethyl) cyclohexane, bis(4-isocyanato-3-methyl-cyclohexyl) methane, α,α,α',α'-tetramethyl-1,3- and/or -1,4-xylylene diisocyanate, 1-isocyanato-1-methyl-4(3-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly(phenylisocyanates) obtained by phosgenating aniline/formaldehyde condensates may also be used.

In accordance with the present invention, at least a portion of the polyisocyanate component may be present in the form of an NCO prepolymer or a polyisocyanate adduct, preferably a polyisocyanate adduct. Suitable polyisocyanate adducts include those containing isocyanurate, uretdione, biuret, urethane, allophanate, carbodiimide and/or oxadiazinetrione groups. The polyisocyanate adducts have an average functionality of 2.0 to 4 and a NCO content of 5 to 48% by weight. Suitable adducts/prepolymers include the following type of components: isocyanurate group-containing polyisocyanates, uretdione diisocyanates, biuret group-containing polyisocyanates, urethane group-containing polyisocyanates, allophanate group-containing polyisocyanates, isocyanurate and allophanate group-containing polyisocyanates, and carbodiimide group-containing polyisocyanates.

Preferred polyisocyanate adducts are the polyisocyanates containing urethane groups, isocyanurate groups, biuret groups or mixtures of isocyanurate and allophanate groups.

The NCO prepolymers, which may also be used as the polyisocyanate component in accordance with the present invention, are prepared from the previously described polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 5,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

It is preferred that the polyisocyanates of the present invention are aromatic polyisocyanates. Some examples of suitable aromatic poly-isocyanates are 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic poly-isocyanates containing 3 or more isocyanate groups such as 4,4',4"-triphenylmethane triisocyanate and polymethylene poly(phenyl-isocyanates) obtained by phosgenating aniline/formaldehyde condensates may also be used.

In accordance with the present invention, the most preferred aromatic polyisocyanates comprise (1) from 50 to 100% by weight of polymethylene poly(phenylisocyanate) having an NCO group content of from 24 to 34% by weight, and preferably from 28 to 33% by weight; and (2) from 0 to 50% by weight of toluene diisocyanate having an NCO group content of about 48% by weight.

These polymethylene poly(phenylisocyanate) suitable for component (A)(1) above comprise 30 to 80%, preferably 35 to 55% by weight of monomeric isocyanate, and from 20 to 70%, preferably 45 to 65% by weight of higher ring compounds of the diphenylmethane diisocyanate series. The monomeric isocyanate content comprises from 65 to 98%, preferably 85 to 98% by weight, of the 4,4'-isomer of diphenylmethane diisocyanate, from 2 to 35%, preferably from 2 to 15% by weight of the 2,4'-isomer of diphenylmethane diisocyanate; and from 0 to 5%, preferably from 0 to 2% by weight of the 2,2'-isomer of diphenyl-methane diisocyanate. As used herein, the phrase higher ring compounds of the diphenylmethane diisocyanate series refers to three-ring, and/or higher ring products derived by phosgenation of aniline-formaldehyde condensation products, and is commonly referred to as polymeric MDI.

The suitable polyisocyanate component for (A)(2) comprises toluene diisocyanate having a NCO group content of about 48%. It is preferred that the toluene diisocyanate comprise from 70 to 100% by weight of the 2,4-isomer and from 0 to 30% of the 2,6-isomer, and most preferably from 70 to 90% of the 2,4-isomer and from 10 to 30% of the 2,6-isomer.

In a preferred embodiment of the present invention, (A) the polyisocyanate component comprises from 75 to 85% by weight of polymethylene poly(phenylisocyanate) and from 15 to 25% by weight of toluene diisocyanate.

Suitable isocyanate-reactive components to be used as component (B) in the present invention comprise polyether polyols having OH numbers of from about 200 to about 800, preferably from about 250 to about 550, and containing from about 3 to about 8 hydroxyl groups, preferably from about 4 to about 6 hydroxyl groups. The level of alkalinity of these polyether polyols is equivalent to a hydroxide ion level of from about 0.006% to about 0.21%, and preferably from about 0.014% to about 0.11% by weight.

It is preferred that these polyether polyols are amine-initiated polyether polyols. By amine-initiated, it is meant that the polyether polyols are prepared by reacting one or more alkylene oxides with an amine starter which has an amine functionality of from about 1 to about 3, preferably from about 1.5 to about 2.5, in the presence of an alkaline catalyst.

Examples of suitable amines include, but are not limited to, aromatic amines such as crude toluene diamine obtained by the nitration of toluene followed by reduction, 2,3-toluene diamine, 3,4-toluene diamine, 2,4-toluene diamine, and 2,6-toluene diamine or mixtures thereof, aniline, 4,4'-methylene dianiline, methylene-bridged polyphenyl polyamines composed of isomers of methylene dianilines and triamines or polyamines of higher molecular weight, prepared by reacting aniline with formaldehyde by methods known in the art, ammonia, alkanol amines such as monoethanol amine, diethanolamine, triethanolamine, organic amines such as methyl amine, ethylene diamine, diethylene triamine and the like, and Mannich reaction products of phenol or substituted phenols with alkanol amines and formaldehyde or paraformaldehyde. Mixture of the above amines may also be used. O-Toluene diamine is a preferred amine for the present invention.

Examples of alkylene oxides useful in producing the polyether polyols of the present invention include: ethylene oxide, propylene oxide, butylene oxide, and mixtures of these alkylene oxides. Combinations of ethylene oxide and propylene oxide are more preferred.

In principle, any alkaline material capable of catalyzing the epoxidation reaction of the present invention may be used. Specific alkaline catalysts which have been found to be particularly suitable include potassium hydroxide, cesium hydroxide and sodium hydroxide. Potassium hydroxide is particularly preferred.

The alkalinity level present in the polyether polyols is equivalent to a hydroxide ion level of from about 0.006% to about 0.21% by weight, and preferably from about 0.014% to about 0.1 1% by weight. Regardless of which alkaline catalyst (e.g. potassium hydroxide, sodium hydroxide, etc.) is used, the catalyst level present in the resultant polyether polyol should be such that equivalent levels of hydroxide ion are present in the polyether polyol. One of ordinary skill in the art would readily determine that a hydroxide ion level of about 0.006% by weight corresponds to about 0.019% by weight KOH or about 0.014% by weight NaOH. Likewise, one of ordinary skill in the art would readily determine that a hydroxide ion level of about 0.21% corresponds to about 0.70% by weight KOH or about 0.50% by weight NaOH. Preferred ranges for the level of alkalinity of the polyether polyols of the present invention are from about 0.048% to about 0.35% by weight KOH, or from about 0.034% to about 0.25% NaOH. The quantity of hydroxide ion present in the polyether polyol may be measured, but is preferably calculated from-the initial charge of alkaline catalyst in the preparation of the polyether polyol.

Polyether polyols containing the appropriate amount of alkalinity to be suitable for the present invention can be prepared by reacting an initiator (preferably an amine-initiator), under appropriate temperature and pressure conditions, with one or more alkylene oxides in the presence of an alkaline catalyst. The reaction mixture is allowed to react until all of the alkylene oxide is consumed. This can be determined by monitoring the pressure in the reactor. If the alkaline catalyst is added in the form of an aqueous solution, the mixture should be heated, under vacuum, to temperatures sufficient to remove the water from the polyol.

The key difference between the presently required polyether polyols and conventional polyether polyols is that these are not neutralized.

Suitable blowing agents useful in the present invention include, for example, water, hydrofluorocarbons such as 1,1-dichloro-1-fluoroethane (HCFC-141b), 1-chloro-1,1-difluoroethane (HCFC-142b), chlorodifluoro-methane (HCFC-22), hydrofluorocarbons such as 1,1,1,3,3-pentafluoro-propane (HFC-245fa), 1,1,1,2-tetrafluoroethane (HFC-134a), 1,1,1,3,3,3-hexafluoropropane (HFC-236fa), 1,1,2,3,3,3-hexafluoropropane (HFC-236ea), 1,1,1,4,4,4-hexafluorobutane (HFC-356mffm), erfluorinated hydrocarbons such as perfluoropentane or perfluorohexane, hydrocarbons such as isomers of pentane and cyclopentane or mixtures of the above. Water, HCFC-141b, HCFC-22, HFC-245fa or mixtures thereof are more preferred. Preferably, the amount of blowing agent used is sufficient to produce foams having a density in the range of from about 1.0 to about 10 pcf, preferably, from about 2 to about 5 pcf.

Other components useful in producing the polyurethanes of the present invention Include catalysts, surfactants, pigments, colorants, fillers, antioxidants, flame retardants, stabilizers, and the like.

When preparing polyisocyanate-based foams, it is generally advantageous to employ a minor amount of a surfactant to stabilize the foaming reaction mixture until it obtains rigidity. Such surfactants advantageously comprise a liquid or solid organosilicon compound. Other, less preferred surfactants include polyethylene glycol ethers of long chain alcohols, tertiary amine or alkanolamine salts of long chain alkyl acid sulfate esters, alkylsulfonic esters and alkylarylsulfonic acids. Such surfactants are employed in amounts sufficient to stabilize the foaming reaction mixture against collapse and the formation of large and uneven cells. Typically, about 0.5 to about 2 parts by weight of the surfactant per 100 parts polyol composition are sufficient for this purpose.

One or more catalysts are advantageously used. Any suitable urethane catalyst may be used including the known tertiary amine compounds and organometallic compounds. Examples of suitable tertiary amine catalysts include triethylenediamine, N-methylmorpholine, pentamethyl diethylenetriamine, dimethylcyclohexylamine, tetramethylethylenediamine, 1-methyl-4-dimethylaminoethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine and dimethyl-benzyl amine. Examples of suitable organometallic catalysts include organomercury, organolead, organoferric and organotin catalysts, with organotin catalysts being preferred. Suitable organotin catalysts include tin salts of carboxylic acids such as dibutyltin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, or certain tertiary amines may also optionally be employed herein. Such catalysts are used in an amount, which measurably increases the rate of reaction of the polyisocyanate. Typical amounts are about 0.1 to about 2.0 part of catalyst per 100 parts by weight of polyol. Examples of such catalysts include the potassium salts of carboxylic acids such as potassium octoate, and the tertiary amine N,N',N"-tris(3-dimethyl-aminopropyl) hexahydro-s-triazine.

The components described may be employed to produce rigid foam. The rigid foams of the present invention may be made in a one-step process by reacting all of the ingredients together at once, or foams can be made by the so-called "quasi prepolymer" method. In the one-shot process where foaming is carried out using machines, the active hydrogen containing compounds, catalyst, surfactants, blowing agents and optional additives may be introduced separately to the mixing head where they are combined with the polyisocyanate to give the polyurethane-forming mixture. The mixture may be poured or injected into a suitable container or molded as required. For use of machines with a limited number of component lines into the mixing head, a premix of all the components except the polyisocyanate can be advantageously employed. This simplifies the metering and mixing of the reacting components at the time the polyurethane-forming mixture is prepared.

Alternatively, the foams may be prepared by the so-called "quasi prepolymer" method. In this method a portion of the polyol component is reacted in the absence of catalysts with the polyisocyanate component in proportion so as to react from about 10 percent to about 30 percent of free isocyanate groups based on the polyisocyanate. To prepare foam, the remaining portion of the polyol is added and the components are allowed to react together in the presence of catalysts and other appropriate additives such as blowing agent, surfactant, etc. Other additives may be added to either the isocyanate prepolymer or remaining polyol or both prior to the mixing of the components, whereby at the end of the reaction a rigid polyurethane foam is provided.

The polyurethane foams of this invention are useful in a wide range of applications. Accordingly, not only can rigid appliance insulating foam be prepared but also spray insulation, rigid insulating board stock, laminates and many other types of rigid foam can easily be prepared according to this invention.

In the process of the present invention, the components may be reacted in an open mold or in a closed mold. These compositions may be reacted according to the present invention using conventional processing techniques at isocyanate indexes ranging from about 80 to about 300, preferably from about 90 to 140). The term "Isocyanate Index" (also commonly referred to as NCO index) is defined herein as the equivalents of isocyanate, divided by the total equivalents of isocyanate-reactive hydrogen containing materials, multiplied by 100.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the working examples:

Polyol A: An ortho-toluenediamine started polyether of ethylene oxide and propylene glycol (37% by weight EO and 63% by weight PO), having a functionality of 4, an OH number of about 395 and a molecular weight of about 568. This polyether polyol contained about 0.0002% KOH (i.e. 2 ppm KOH). The level of alkalinity in this polyether polyol is equivalent to a hydroxide ion level of about 0.00006% or 0.6 ppm.

Polyol A was prepared by charging ortho-toluenediamine (o-TDA) (22.9 parts by weight) into a reactor. The reactor was sealed, one bar of nitrogen was added and the reaction mixture was heated to 115° C. Ethylene oxide (28.5 parts by weight) was added and allowed to react at 115° C. until all of the EO was consumed as evidenced by monitoring reactor pressure. The KOH catalyst (0.19 parts by weight) was added and the nitrogen pad was replaced. The propylene oxide block (48.6 parts by weight) was added, and allowed to react at 115° C. until all of the PO was consumed as evidenced by monitoring reactor pressure. Both EO and PO were fed at a rate sufficient to keep the total reaction pressure at or near 45 psia. The reaction mixture was cooled to 90° C., and the KOH was neutralized with 100% of the theoretical amount of 20% aqueous sulfuric acid necessary to neutralize the KOH. The water was removed by vacuum distillation and the product filtered to remove potassium sulfate.

Polyol B: An ortho-toluenediamine started polyether of ethylene oxide and propylene oxide (37% by weight EO and 63% by weight PO), having a functionality of 4, an OH number of about 395 and a molecular weight of about 568. Since this polyether polyol was neutralized with excess lactic acid, it contains no potassium hydroxide.

Polyol B was prepared by charging ortho-toluenediamine (o-TDA) (22.9 parts by weight) into a reactor. The reactor was sealed, one bar of nitrogen was added and the reaction mixture was heated to 115° C. The ethylene oxide (28.5 parts by weight) was added and allowed to react at 115° C. until all of the EO was consumed as evidenced by monitoring reactor pressure. The KOH catalyst (0.19 parts by weight) was added and the nitrogen pad was replaced. The reaction mixture was heated to 150° C. before propylene oxide (48.6 parts by weight) was added. The reaction mixture was allowed to react at 150° C. until all of the PO was consumed, as evidenced by monitoring reactor pressure: Both EO and PO were fed at a rate sufficient to keep the total reaction pressure between 45 and 60 psia. The reaction mixture was cooled to 90° C. and the KOH was neutralized with 110% of the theoretical amount of 88% aqueous lactic acid necessary to neutralize the KOH. The water was removed by vacuum distillation.

Polyol C: An ortho-toluenediamine started polyether of ethylene oxide and propylene oxide (37% by weight EO and 63% by weight PO), having a functionality of 4, an OH number of about 395 and a molecular weight of about 568. This unneutralized polyether polyol contains about 0.19% by weight of alkalinity present in the form of potassium hydroxide (KOH). This level of alkalinity in Polyol C is equivalent to a hydroxide ion level of about 0.06% by weight.

Polyol C was prepared by charging ortho-toluenediamine (o-TDA) (22.9 parts by weight) into a reactor. The reactor was sealed, one bar of nitrogen was added and the reaction mixture was heated to 115° C. The ethylene oxide (28.5 parts by weight) was added and allowed to react at 115° C. until all of the EO was consumed, as evidenced by monitoring the reactor pressure. Then, the KOH catalyst (0.19 parts by weight) was added and the nitrogen pad was replaced. The reaction mixture was heated to 150° C. before propylene oxide (48.6 parts by weight) was added. The reaction mixture was allowed to react at 150° C. until all of the PO was consumed, as evidenced by monitoring the reactor pressure. Both EO and PO were fed at a rate sufficient to keep the total reaction pressure between 45 and 60 psia. The alkaline polyol product was cooled and removed from the reactor.

Polyol D: A sucrose/propylene glycol/water based polyol (87:7:6) having a functionality of 5.8 and an OH number of from 380 to 390.

Polyol E: An aromatic polyester polyol having an OH number of about 240 mg KOH/g which is commercially available under the designation Stepanpol PS-2502A from Stepan Company.

Polyol F: An ortho-toluenediamine started polyether of ethylene oxide and propylene glycol (37% by weight EO and 63% by weight PO), having a functionality of 4, an OH number of about 395 and a molecular weight of about 568. The alkaline polyether polyol contains about 0.1.9% by weight KOH. This level of alkalinity in Polyol F is equivalent to a hydroxide ion level of about 0.06% by weight.

Polyol F was prepared by adding a sample of Polyol A (2500 g) to a reactor equipped with a stirrer and a vacuum adapter. A 46% by weight aqueous solution of KOH (10.33 g) was added to the polyol. This mixture was heated with stirring under vacuum (~0.5 mm HG) to 100° C. for 2 hours to strip off the water from the KOH solution.

Surfactant: A silicon surfactant, which is commercially available under the designation Tegostab® B-8462 from Goldschmidt Company.

Catalyst A: (Pentamethyldiethylenetriamine) A tertiary amine catalyst that is commercially available from Rhein Chemie Corporation under the name Desmorapid PV.

Catalyst B: Dimethylcyclohexylamine, commercially available from Air Products under the name Polycat 8.

Blowing Agent A: 1,1-dichloro-1-fluoroethane.

Iso A: a polymeric diphenylmethane diisocyanate having an NCO group content of about 31.5%, a functionality of about 2.8, and a viscosity of about 196 mPa.s at 25° C., and containing about 43% by weight of monomeric diphenylmethane diisocyanate and about 57% by weight of higher ring compounds of the diphenylmethane diisocyanate series (i.e. polymeric MDI). Of the monomer content, about 96% by weight comprises 4,4'-diphenylmethane diisocyanate and about 4% by weight comprises 2,4'-diphenylmethane diisocyanate.

The following foam formulations were used to assess the non-neutralized polyether polyols of the present invention vs. conventional neutralized polyether polyols, and their effect on foam processing including rise heights, rise times and pressures generated during the foaming process. The physical and mechanical properties were then evaluated on rigid foams prepared from the non-neutralized polyether polyols vs. conventional neutralized polyether polyols.

TABLE 1

Foam Formulations for Comparison of Non-Neutralized Polyether Polyols (i.e. polyether polyols containing alkalinity in the form of potassium hydroxide) with Conventional, Neutralized Polyether Polyols in HCFC 141b Blown Rigid Foam

| Component | Example 1 | Example 2 | Example 3 |
|---|---|---|---|
| Polyol A | 55.5 | | |
| Polyol C | | 55.5 | |
| Polyol B | | | 55.5 |

TABLE 1-continued

Foam Formulations for Comparison of Non-Neutralized Polyether Polyols (i.e. polyether polyols containing alkalinity in the form of potassium hydroxide) with Conventional, Neutralized Polyether Polyols in HCFC 141b Blown Rigid Foam

| Component | Example 1 | Example 2 | Example 3 |
|---|---|---|---|
| Polyol D | 15.9 | 15.9 | 15.9 |
| Polyol E | 7.9 | 7.9 | 7.9 |
| Surfactant | 1.7 | 1.7 | 1.7 |
| Water | 1.7 | 1.7 | 1.7 |
| Catalyst A | 0.2 | 0.2 | 0.2 |
| Catalyst B | 0.2 | 0.2 | 0.2 |
| Iso A | 102 | 102 | 102 |
| Blowing Agent A | 16.9 | 16.9 | 16.9 |

Each of the examples in Tables 2, 4 and 5 below represents the average of three (3) runs (except as otherwise noted), and each of the examples in Table 3 represents the average of two (2) runs.

TABLE 2

Rigid Foam Tube (RFT) Data for Polyol C, Polyol A, and Polyol B on the Rigid Foam Formulations Shown in Table 1

| Example | Polyol | Rise Height (cm) | $P_{max.}$ (hPa) | Time @ $P_{max.}$ (s) | $V_{max.}$ (cm/s) | Time @ $V_{max.}$ (s) |
|---|---|---|---|---|---|---|
| Example 1 | Polyol A | 79.8 | 44.9 | 241.0 | 68.1 | 43.7 |
| Example 2 | Polyol C | 77.4 | 45.2 | 233.7 | 81.3 | 37.3 |
| Example 3 | Polyol B | 73.0 | 77.8 | 202.2 | 74.5 | 42.0 |

These data indicated that the foam formulation prepared from the non-neutralized polyether polyol (Polyol C) leads to faster rising foam than either of the formulations prepared from the neutralized polyether polyols Polyol A and Polyol B. Surprisingly, there is no evidence that the residual hydroxide leads to excessive pressure like the potassium lactate does, since peak pressure (i.e $P_{max}$) is only slightly higher than Polyol A, which was neutralized with sulfuric acid, and much lower than the lactic acid neutralized Polyol B.

The properties of finished foams prepared from each of these three polyols were also investigated and the results are set forth in Table 3A and Table 3B. The density, compressive strength, dimensional stability, thermal conductivity and open cell content do not differ significantly for foams based on the three different amine initiated polyols (Polyol A, Polyol B, or Polyol C). This illustrates that essentially the same foam is prepared regardless of which polyol Is used and how it is prepared, including whether or not it is neutralized to remove remaining alkalinity from the KOH catalyst.

TABLE 3A

Foam Properties of the Rigid Foam Formulations Show in Table 1

| Foam Description | Core Density (pcf) | 10% Comp. Stress[a] (psi) | 10% Comp. Stress[b] (psi) | ΔVolume 07 day[c] (% Change) | ΔVolume 07 day[d] (% Change) | Thermal Conductivity (k) | Closed Cells (% closed) |
|---|---|---|---|---|---|---|---|
| 5% Overpack: | | | | | | | |
| Example 1 | 1.96 | 17.9 | 30.2 | −0.9 | 0.6 | 0.134 | 88.7 |

TABLE 3A-continued

Foam Properties of the Rigid Foam Formulations Show in Table 1

| Foam Description | Core Density (pcf) | 10% Comp. Stress[a] (psi) | 10% Comp. Stress[b] (psi) | ΔVolume 07 day[c] (% Change) | ΔVolume 07 day[d] (% Change) | Thermal Conductivity (k) | Closed Cells (% closed) |
|---|---|---|---|---|---|---|---|
| Example 2 | 1.92 | 19.4 | 30.6 | −1.0 | 0.6 | 0.134 | 89.0 |
| Example 3 | 1.94 | 17.6 | 30.2 | −1.0 | 0.4 | 0.134 | 88.6 |

[a]measured perpendicular to the direction of rise of the foam
[b]measured parallel to the direction of rise of the foam
[c]change in volume of a sample of the foam after storing for 7 days at 70° C. in a dry oven
[d]change in volume of a sample of the foam after storing for 7 days at −30° C.

TABLE 3B

Foam Properties of the Rigid Foam Formulations Show in Table 1

| Foam Description | Core Density (pcf) | 10% Comp. Stress[a] (psi) | 10% Comp. Stress[b] (psi) | ΔVolume 07 day[c] (% Change) | ΔVolume 07 day[d] (% Change) | Thermal Conductivity (k) | Closed Cells (% closed) |
|---|---|---|---|---|---|---|---|
| 15% Overpack: | | | | | | | |
| Example 1 | 2.09 | 22.5 | 30.6 | −0.6 | 0.5 | 0.136 | 89.2 |
| Example 2 | 2.10 | 24.0 | 31.6 | −0.9 | −0.4 | 0.134 | 89.2 |
| Example 3 | 2.07 | 21.8 | 32.5 | −0.5 | 0.1 | 0.134 | 89.0 |

[a]measured perpendicular to the direction of rise of the foam
[b]measured parallel to the direction of rise of the foam
[c]change in volume of a sample of the foam after storing for 7 days at 70° C. in a dry oven
[d]change in volume of a sample of the foam after storing for 7 days at −30° C.

Next a series of experiments was run to determine the effect of degree of neutralization of the KOH by lactic acid. In Table 4, the same foam formulation as the formulation set forth in Table 1 was used, with the exception being that the polyol component used in the foam formulations for Table 4 comprised a mixture of Polyol B and Polyol C in the various %'s by weight as shown in Table 4. The combined weight of Polyol B and Polyol C totaled 55.5 parts by weight in each example of Table 4. Each Example in Table 4 represents the average of three (3) runs. As the amount of Polyol C increases from 0 to 100%, one observes a dramatic drop in maximum pressure.

TABLE 4

Foam Tube Data for Rigid Foam Formulations Prepared from a Polyol Comprising a Mixture of Polyol B and Polyol C

| Example | Polyol B (%) | Polyol C (%) | Rise Height (cm) | $P_{max}$ (hPa) | Time @ $P_{max}$ (s) | $V_{max}$ (cm/100s) | Time @ $V_{max}$ (s) |
|---|---|---|---|---|---|---|---|
| 4a | 100 | 0 | 73.0 | 77.8 | 202.0 | 74.5 | 42.0 |
| 4b | 75 | 25 | 77.3 | 66.0 | 192.3 | 82.7 | 38.6 |
| 4c | 50 | 50 | 77.0 | 59.0 | 201.0 | 80.7 | 38.0 |
| 4d | 25 | 75 | 77.0 | 50.8 | 224.0 | 80.2 | 38.0 |
| 4e | 0 | 100 | 77.4 | 45.2 | 233.7 | 81.3 | 37.3 |

In Table 5, the same foam formulation as that set forth in Table 1 was used, with the exception being that the polyol component used in the foam formulations for Table 5 comprised a mixture of Polyol A and Polyol F in the various %'s by weight as shown in Table 5. The combined weight of Polyol A and Polyol F totaled 55.5 parts by weight in each example of Table 5. Each Example in Table 5 represents the average of three (3) runs, except the example using 98% by weight of Polyol A and 2% by weight of Polyol F. This example reports the average of two (2) runs.

These results show that an increase in the quantity of Polyol F, resulted in an increase in $V_{max}$, without giving increased pressure ($P_{max}$) during foaming.

TABLE 5

Foam Tube Data for Rigid Foam Formulations Prepared from a Polyol Comprising a Mixture of Polyol A and Polyol F

| Example | Polyol A (%) | Polyol F (%) | Rise Height (cm) | $P_{max}$ (hPa) | Time @ $P_{max}$ (s) | $V_{max}$ (cm/100s) | Time @ $V_{max}$ (s) |
|---|---|---|---|---|---|---|---|
| 5a | 100 | 0 | 79.8 | 44.9 | 241.0 | 68.1 | 43.7 |
| 5b | 98 | 2 | 79.4 | 45.6 | 241.5 | 67.4 | 42.5 |
| 5c | 96 | 4 | 80.0 | 43.2 | 236.7 | 69.2 | 43.7 |
| 5d | 90 | 10 | 80.1 | 41.8 | 230.7 | 72.6 | 42.0 |
| 5e | 75 | 25 | 78.4 | 34.6 | 253.7 | 72.1 | 41.3 |
| 5f | 50 | 50 | 79.8 | 37.2 | 247.0 | 74.0 | 40.3 |
| 5g | 25 | 75 | 79.3 | 39.5 | 242.3 | 75.7 | 40.0 |
| 5h | 0 | 100 | 78.8 | 41.1 | 236.3 | 76.5 | 39.7 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a rigid polyurethane foam comprising
   (1) reacting
      (A) a polyisocyanate component having an NCO group content of from 20 to 60% by weight,
   with
      (B) an isocyanate-reactive component comprising an alkaline polyether polyol having an OH number of from 200 to 800 and containing from 3 to 8 hydroxyl groups, wherein the level of alkalinity of said alkaline polyether polyol is equivalent to a hydroxide ion level of from about 0.006% to about 0.21% by weight;

in the presence of:

(C) at least one blowing agent.

2. The process of claim 1, wherein (A) said polyisocyanate component comprises an aromatic polyisocyanate.

3. The process of claim 2, wherein (A) said polyisocyanate comprises:

(1) from 50 to 100% by weight, based on 100% by weight of (A), of polymethylene poly(phenylisocyanate) having an NCO group content of from 24 to 34%, which comprises from 30 to 80% by weight of monomeric isocyanate and from 20 to 70% by weight of higher ring compounds of the diphenylmethane diisocyanate series, wherein the monomeric isocyanate comprises from 65 to 98% by weight of the 4,4'-isomer of diphenylmethane diisocyanate, from 2 to 35% by weight of the 2,4'-isomer of diphenylmethane diisocyanate and from 0 to 5% by weight of the 2,2'-isomer of diphenylmethane diisocyanate; and (2) from 0 to 50% by weight, based on 100% by weight of (A), of toluene diisocyanate having an NCO group content of about 48%.

4. The process of claim 1, wherein the level of alkalinity of said polyether polyol is equivalent to a hydroxide ion level of from about 0.014% to about 0.11% by weight.

5. The process of claim 1, wherein (B) said isocyanate-reactive component comprises an amine-initiated polyether polyol.

6. The process of claim 5, wherein the amine-initiator for said amine-initiated polyether polyol comprises o-toluene diamine.

7. The process of claim 1, wherein said blowing agent is selected from the group consisting of water, hydrochlorofluorocarbons, hydrofluorocarbons and mixtures thereof.

8. A process for the preparation of a rigid polyurethane foam comprising (1) reacting (A) a polyisocyanate component having an NCO group content of from 20 to 60% by weight, with (B) an isocyanate-reactive component comprising an alkaline polyether polyol having an OH number of from 200 to 800 and containing from 3 to 8 hydroxyl groups, wherein the level of alkalinity of said alkaline polyether polyol is equivalent to about 0.019% to about 0.70% by weight of potassium hydroxide;

in the presence of:

(C) at least one blowing agent.

9. The process of claim 8, wherein (A) said polyisocyanate comprises an aromatic polyisocyanate.

10. The process of claim 9, wherein (A) said aromatic polyisocyanate comprises:

(1) from 50 to 100% by weight, based on 100% by weight of (A), of polymethylene poly(phenylisocyanate) having an NCO group content of from 24 to 34%, which comprises from 30 to 80% by weight of monomeric isocyanate and from 20 to 70% by weight of higher ring compounds of the diphenylmethane diisocyanate series, wherein the monomeric isocyanate comprises from 65 to 98% by weight of the 4,4'-isomer of diphenylmethane diisocyanate, from 2 to 35% by weight of the 2,4'-isomer of diphenylmethane diisocyanate and from 0 to 5% by weight of the 2,2'-isomer of diphenylmethane diisocyanate; and (2) from 0 to 50% by weight, based on 100% by weight of (A), of toluene diisocyanate having an NCO group content of about 48%.

11. The process of claim 8, wherein the level of alkalinity of said polyether polyol is equivalent to about 0.048% to about 0.35% by weight of potassium hydroxide.

12. The process of claim 8, wherein (B) said isocyanate-reactive component comprises an amine-initiated polyether polyol.

13. The process of claim 12, wherein the amine-initiator for said amine-initiated polyether polyol comprises o-toluene diamine.

14. The process of claim 8, wherein said blowing agent is selected from the group consisting of water, hydrochlorofluorocarbons, hydrofluorocarbons and mixtures thereof.

15. A process for the preparation of a rigid polyurethane foam comprising (1) reacting (A) a polyisocyanate component having an NCO group content of from 20 to 60% by weight, with (B) an isocyanate-reactive component comprising an alkaline polyether polyol having an OH number of from 200 to 800 and containing from 3 to 8 hydroxyl groups, wherein the level of alkalinity of said alkaline polyether polyol is equivalent to about 0.014% to about 0.50% of sodium hydroxide;

in the presence of:

(C) at least one blowing agent.

16. The process of claim 15, wherein (A) said polyisocyanate comprises an aromatic polyisocyanate.

17. The process of claim 16, wherein (A) said aromatic polyisocyanate comprises:

(1) from 50 to 100% by weight, based on 100% by weight of (A), of polymethylene poly(phenylisocyanate) having an NCO group content of from 24 to 34%, which comprises from 30 to 80% by weight of monomeric isocyanate and from 20 to 70% by weight of higher ring compounds of the diphenylmethane diisocyanate series, wherein the monomeric isocyanate comprises from 65 to 98% by weight of the 4,4'-isomer of diphenylmethane diisocyanate, from 2 to 35% by weight of the 2,4'-isomer of diphenylmethane diisocyanate and from 0 to 5% by weight of the 2,2'-isomer of diphenylmethane diisocyanate; and (2) from 0 to 50% by weight, based on 100% by weight of (A), of toluene diisocyanate having an NCO group content of about 48%.

18. The process of claim 15, wherein the level of alkalinity of said polyether polyol is equivalent to about 0.034% to about 0.25% by weight of sodium hydroxide.

19. The process of claim 15, wherein (B) said isocyanate-reactive component comprises an amine-initiated polyether polyol.

20. The process of claim 19, wherein the amine-initiator for said amine-initiated polyether polyol comprises o-toluene diamine.

21. The process of claim 15, wherein said blowing agent is selected from the group consisting of water, hydrochlorofluorocarbons, hydrofluorocarbons and mixtures thereof.

* * * * *